T 864012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 731

814,189
CONTAINER FOR PHOTOGRAPHIC PROCESSING LIQUIDS

Kenneth C. Kennard and Ralph F. Porter, both
% Eastman Kodak Co., Rochester, N.Y. 14650

Filed Apr. 7, 1969. Published July 15, 1969
Int. Cl. G03c *1/48*
U.S. Cl. 96—76
No Drawing. 10 Pages Specification

Rupturable thermoplastic container for photographic processing liquids, said container having a continuous layer of vapor-deposited silicon dioxide to improve the moisture- and vapor-impervious properties of the container.